United States Patent
Lin

(10) Patent No.: US 12,057,942 B2
(45) Date of Patent: Aug. 6, 2024

(54) USER EQUIPMENT AND METHOD FOR ONE-SHOT HYBRID AUTOMATIC REPEAT REQUEST FEEDBACK OF SAME

(71) Applicant: GUANGDONG OPPO MOBILE TELECOMMUNICATIONS CORP., LTD., Guangdong (CN)

(72) Inventor: Hao Lin, Neuilly sur Seine (FR)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 216 days.

(21) Appl. No.: 17/858,804

(22) Filed: Jul. 6, 2022

(65) Prior Publication Data

US 2022/0337351 A1 Oct. 20, 2022

Related U.S. Application Data

(63) Continuation of application No. PCT/IB2020/000040, filed on Jan. 7, 2020.

(51) Int. Cl.
*H04L 1/1812* (2023.01)
*H04L 1/1829* (2023.01)

(52) U.S. Cl.
CPC .......... *H04L 1/1812* (2013.01); *H04L 1/1835* (2013.01)

(58) Field of Classification Search
None
See application file for complete search history.

(56) References Cited

U.S. PATENT DOCUMENTS

| | | | |
|---|---|---|---|
| 2020/0106565 A1* | 4/2020 | Li | H04W 74/0808 |
| 2020/0259601 A1* | 8/2020 | Zhou | H04L 5/0087 |
| 2022/0393799 A1* | 12/2022 | Li | H04L 1/1822 |

OTHER PUBLICATIONS

International Search Report (ISR) dated Oct. 6, 2020 for Application No. PCT/IB2020/000040.
Written Opinion of the International Searching Authority dated Jan. 7, 2020 for Application No. PCT/IB2020/000040.
XIAOMI:"Discussion on HARQ enhancement for NR-U", 3GPP Draft; R1-1911992, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 18, 2019-Nov. 22, 2019 Nov. 8, 2019 (Nov. 8, 2019), XP051819887, entire document.
(Continued)

*Primary Examiner* — Benjamin Lamont
(74) *Attorney, Agent, or Firm* — Ladas & Parry, LLP

(57) ABSTRACT

A user equipment (UE) and a method for one-shot hybrid automatic repeat request (HARQ) feedback of the same capable of reducing acknowledgement (ACK)/negative acknowledgement (NACK) (AN) status ambiguity between a network (e.g., gNB) and the UE are provided. The method includes being configured with a one-shot HARQ-ACK feedback function, receiving a physical downlink shared channel (PDSCH) transmission with an associated determined HARQ process identity (ID), and updating an AN status in a one-shot AN buffer for the associated determined HARQ process ID based on an already buffered AN status of the associated determined HARQ process ID and a PDSCH transmission status.

14 Claims, 7 Drawing Sheets

(56) References Cited

OTHER PUBLICATIONS

Huawei et al:"HARQ enhancements in NR unlicensed", 3GPP Draft; R1-1910047, 3rd Generation Partnership Project (3GPP), Mobile Competence Centre; 650, Route Des Lucioles; F-06921 Sophia-Antipolis Cedex; France, vol. RAN WG1, No. Chongqing, China; Oct. 14, 2019-Oct. 20, 2019 Oct. 8, 2019 (Oct. 8, 2019), XP051809061, entire document.

* cited by examiner

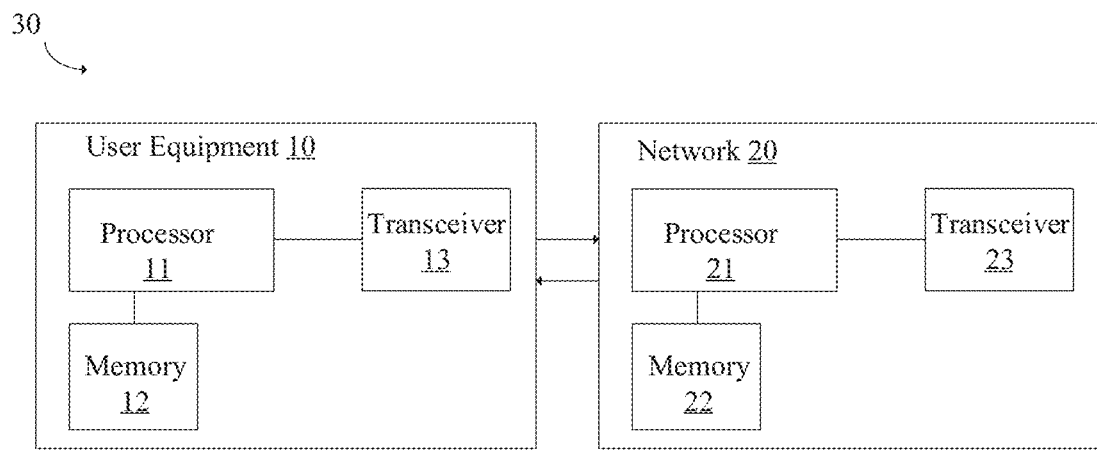

FIG. 1

Being configured with a one-shot HARQ-acknowledgement (ACK) feedback function

↓

Receiving a physical downlink shared channel (PDSCH) transmission with an associated determined HARQ process identity (ID)

↓

Updating an access ACK/NACK (AN) status in a one-shot AN buffer for the associated determined HARQ process ID (HARQ status new) based on an already buffered AN status of the associated determined HARQ process ID (HARQ status old) and a PDSCH transmission status

USER EQUIPMENT AND METHOD FOR ONE-SHOT HYBRID AUTOMATIC REPEAT REQUEST FEEDBACK OF SAME

CROSS-REFERENCE TO RELATED APPLICATIONS

This application is a continuation of International Application No. PCT/IB2020/000040, filed on Jan. 7, 2020, which is hereby incorporated by reference in its entirety.

TECHNICAL FIELD

The present disclosure relates to the field of communication systems, and more particularly, to a user equipment (UE) and a method for one-shot hybrid automatic repeat request (HARQ) feedback of the same, which can reduce acknowledgement (ACK)/negative acknowledgement (NACK) status ambiguity between a base station (Node B, NB) and the UE and provide a good communication performance and high reliability.

BACKGROUND

One-shot hybrid automatic repeat request (HARQ) codebook maps ACK/NACK (AN) status to a HARQ identity (ID) directly. Therefore, in some scheduling cases, there might be ambiguity between a user equipment (UE) and a network (e.g., gNodeB, gNB) about mapping of AN status to HARQ ID. This problem is more severe with one-shot mode 1 once the network schedules the same HARQ ID for new transmission. But an issue also exists in mode 2 when a semi-persistently scheduled (SPS) physical downlink shared channel (PDSCH) transmission is configured.

Therefore, there is a need for a user equipment (UE) and a method for one-shot hybrid automatic repeat request (HARQ) feedback of the same, which can reduce ACK/NACK (AN) status ambiguity between a network (e.g., gNB) and the UE and provide a good communication performance and high reliability.

SUMMARY

An object of the present disclosure is to propose a user equipment (UE) and a method for one-shot hybrid automatic repeat request (HARQ) feedback of the same, which can reduce ACK/NACK (AN) status ambiguity between a network (e.g., gNB) and the UE and provide a good communication performance and high reliability.

In a first aspect of the present disclosure, a user equipment for one-shot HARQ feedback includes a memory, a transceiver, and a processor coupled to the memory and the transceiver. The processor is configured to: be configured with a one-shot HARQ-acknowledgement (ACK) feedback function, receive a physical downlink shared channel (PDSCH) transmission with an associated determined HARQ process identity (ID), and update an ACK/NACK (AN) status in a one-shot AN buffer for the associated determined HARQ process ID based on an already buffered AN status of the associated determined HARQ process ID and a PDSCH transmission status.

In a second aspect of the present disclosure, a method for one-shot HARQ feedback of a user equipment includes being configured with a one-shot HARQ-acknowledgement (ACK) feedback function, receiving a physical downlink shared channel (PDSCH) transmission with an associated determined HARQ process identity (ID), and updating an ACK/NACK (AN) status in a one-shot AN buffer for the associated determined HARQ process ID based on an already buffered AN status of the associated determined HARQ process ID and a PDSCH transmission status.

In a third aspect of the present disclosure, a non-transitory machine-readable storage medium has stored thereon instructions that, when executed by a computer, cause the computer to perform the above method.

In a fourth aspect of the present disclosure, a chip includes a processor, configured to call and run a computer program stored in a memory, to cause a device in which the chip is installed to execute the above method.

In a fifth aspect of the present disclosure, a computer readable storage medium, in which a computer program is stored, causes a computer to execute the above method.

In a sixth aspect of the present disclosure, a computer program product includes a computer program, and the computer program causes a computer to execute the above method.

In a seventh aspect of the present disclosure, a computer program causes a computer to execute the above method.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

FIG. 1 is a block diagram of a user equipment (UE) and a network (e.g., gNB) for one-shot hybrid automatic repeat request (HARQ) feedback in a communication network system according to an embodiment of the present disclosure.

FIG. 2 is a flowchart illustrating a method for one-shot HARQ feedback of a UE according to an embodiment of the present disclosure.

DESCRIPTION OF EMBODIMENTS

Figure 3:
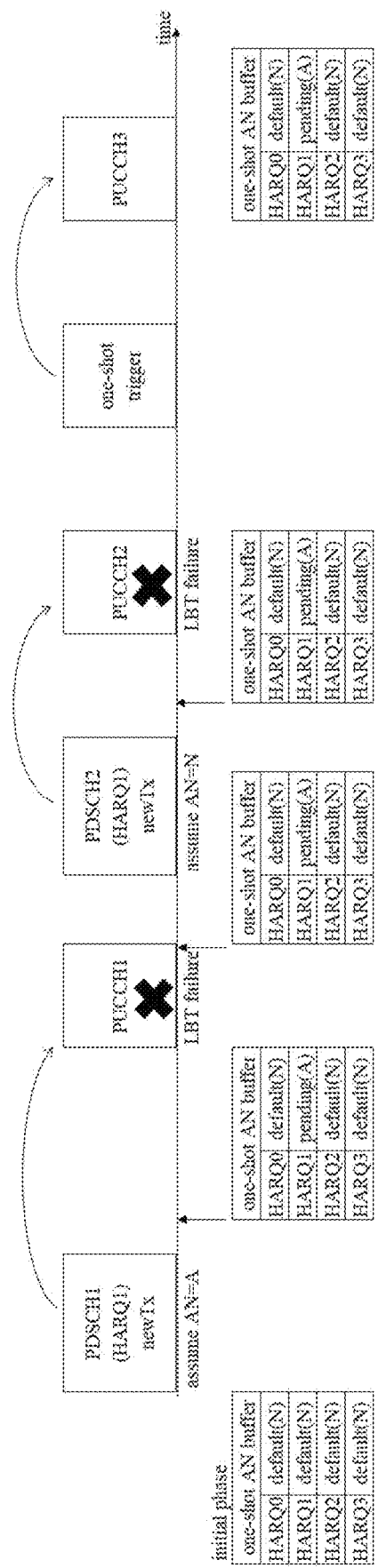
FIG. 3 is a schematic diagram illustrating an example for UE to prepare ACK/NACK (AN) status for one-shot HARQ-ACK feedback according to an embodiment of the present disclosure.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Introduction of Unlicensed Spectrum:

The unlicensed spectrum is a shared spectrum. Communication equipment in different communication systems can use the spectrum if it meets regulatory requirements set by a country or region on the spectrum and does not need to apply for a proprietary spectrum authorization from the government.

In order to allow various communication systems that use unlicensed spectrum for wireless communication to coexist friendly in the spectrum, some countries or regions specify regulatory requirements that must be met to use unlicensed spectrum. For example, the communication device follows the principle of "listen before talk (LBT)", that is, a device needs to perform channel sensing before transmitting a signal on a channel. Only when an LBT outcome shows that the channel is idle, the device can perform signal transmission; otherwise, the device cannot perform signal transmission. In order to ensure fairness, once a device successfully occupies the channel, a transmission duration cannot exceed a maximum channel occupancy time (MCOT).

R16 One-Shot HARQ-ACK Feedback:

In R16 NRU (NewRadio in Unlicensed Spectrum), a one-shot hybrid automatic repeat request (HARQ)—acknowledgement (ACK) feedback is a newly introduced feature. When one-shot is triggered by a network, a user equipment (UE) feedbacks all ACK/negative acknowledgement (NACK) (A/N) feedback for all configured HARQ process identities. To be more specific, there are two modes of one-shot feedback. In the first mode, the AN feedback includes only the AN of all the HARQ process identity (ID). When this mode is configured, the UE will set the AN status to NACK once the UE has transmitted physical uplink control channel (PUCCH) carrying AN feedback. However, when the PUCCH is not transmitted, e.g. due to LBT failure, the UE will maintain the AN status. In the second mode, the AN feedback includes the AN and the latest new data indicator (NDI) status of the corresponding HARQ process ID. For any HARQ ID that is scheduled after the last determined PDSCH for which A/N decoding result is reported, the UE does not consider this PDSCH for one-shot HARQ codebook composition. The one-shot HARQ codebook is composed based on the HARQ ID ordering.

R15 PDSCH Scheduling Restriction:

In R15, when a network schedules a physical downlink shared channel (PDSCH) to a UE with a given HARQ process ID. The same HARQ ID is not expected to be re-scheduled before the corresponding PUCCH transmission occasion. But after this PUCCH transmission occasion, the same HARQ ID can be reused for either new transmission or retransmission based on an NDI status. In the one-shot feedback without NDI reporting mode, the AN status is one-to-one mapping with the configured HARQ process ID. If the same process ID is used for scheduling more than one PDSCH new transmissions, a gNB does not know which PDSCH the UE refers to only based on AN to HARQ process ID mapping, thereby yielding the AN status ambiguity.

Embodiments of the present disclosure provide a UE with a method for one-shot HARQ feedback in the mode of one-shot feedback without NDI reporting. The presented method can reduce AN status ambiguity between a network (e.g., gNB) and the UE, which happens in the case where the same HARQ process ID is reused for more than one PDSCH transmission.

FIG. 1 illustrates that, in some embodiments, a user equipment (UE) 10 and a network (e.g., gNB) 20 for one-shot HARQ feedback in a communication network system 30 according to an embodiment of the present disclosure are provided. The communication network system 30 includes the UE 10 and the network 20. The UE 10 may include a memory 12, a transceiver 13, and a processor 11 coupled to the memory 12, the transceiver 13. The network 20 may include a memory 22, a transceiver 23, and a processor 21 coupled to the memory 22, the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the processor 11 is configured to: be configured with a one-shot HARQ-acknowledgement (ACK) feedback function, receive a physical downlink shared channel (PDSCH) transmission with an associated determined HARQ process identity (ID), and update an ACK/NACK (AN) status in a one-shot AN buffer for the associated determined HARQ process ID (HARQ status new) based on an already buffered AN status of the associated determined HARQ process ID (HARQ status old) and a PDSCH transmission status. This can greatly reduce AN status ambiguity between the network (e.g., gNB) 20 and the UE 10.

In some embodiments, the already buffered AN status of the associated determined HARQ process ID is a default status, a pending status, or a frozen status. In some embodiments, the PDSCH transmission status is a new transmission or a retransmission.

In some embodiments, updating the AN status in the one-shot AN buffer for the associated determined HARQ process ID (HARQ status new) comprises that: if the PDSCH transmission status is the new transmission and if the already buffered AN status of the associated determined HARQ process ID (HARQ status old) is the default status, the processor 11 sets the AN status in the one-shot AN buffer for the associated determined HARQ process ID (HARQ status new) as the pending status, where the pending status is an ACK if the PDSCH transmission status is successfully received, otherwise the pending status is a negative acknowledgement (NACK); if the PDSCH transmission status is the retransmission and if the already buffered AN status of the associated determined HARQ process ID (HARQ status old) is the default status, the processor 11 sets the AN status in the one-shot AN buffer for the associated determined HARQ process ID (HARQ status new) as the pending status, where the pending status is an ACK if the PDSCH transmission status is successfully received, otherwise the pending status is a NACK. That is, the default status can be changed to the pending status, if the PDSCH is the new transmission or the retransmission.

In another embodiment, updating the AN status in the one-shot AN buffer for the associated determined HARQ process ID (HARQ status new) comprises that: if the PDSCH transmission status is the new transmission and if the already buffered AN status of the associated determined HARQ process ID (HARQ status old) is the default status, the processor 11 sets the AN status in the one-shot AN buffer for the associated determined HARQ process ID (HARQ status new) as the pending status, where the pending status is an ACK if the PDSCH transmission status is successfully received, otherwise the pending status is a negative acknowledgement (NACK); if the PDSCH transmission status is the retransmission and if the already buffered AN status of the associated determined HARQ process ID is the default status, the processor 11 sets the AN status in the one-shot AN buffer for the associated determined HARQ process ID as the default status. That is, the default status can be updated to the pending status only by the new transmission. In addition, the default status is maintained in the one-shot AN buffer for the associated determined HARQ process ID, if the PDSCH is the retransmission.

In some embodiments, updating the AN status in the one-shot AN buffer for the associated determined HARQ process ID (HARQ status new) comprises that: if the PDSCH transmission status is the new transmission and if the already buffered AN status of the associated determined HARQ process ID (HARQ status old) is the pending status, the processor 11 neglects an AN outcome of a PDSCH reception and sets the AN status in the one-shot AN buffer for the associated determined HARQ process ID (HARQ status new) as the already buffered AN status of the associated determined HARQ process ID (HARQ status old), or the processor sets the AN status in the one-shot AN buffer for the associated determined HARQ process ID (HARQ status new) as the frozen status; if the PDSCH transmission status is the retransmission and if the already buffered AN status of the associated determined HARQ process ID (HARQ status old) is the pending status, the processor 11 updates the AN status in the one-shot AN buffer for the associated determined HARQ process ID (HARQ status new) by setting the pending status to an ACK if the PDSCH is successfully received; otherwise the pending status is a NACK. That is, the pending status can only be updated by the retransmission.

In some embodiments, updating the AN status in the one-shot AN buffer for the associated determined HARQ process ID (HARQ status new) comprises that: if either the PDSCH transmission status is the new transmission or the retransmission and if the already buffered AN status of the associated determined HARQ process ID (HARQ status old) is the frozen status, the processor 11 keeps the frozen status in the one-shot AN buffer for the associated determined HARQ process ID and neglects an AN outcome of a PDSCH reception. That is, the frozen status cannot be updated by new PDSCH transmission or retransmission of the same HARQ process ID.

In some embodiments, the default status is a NACK, the pending status is an actual AN of a PDSCH reception, and the frozen status is a NACK. In some embodiments, when a physical uplink control channel (PUCCH) is not for one-shot AN feedback but carries the AN status of the associated determined HARQ process ID whose AN status in the one-shot AN buffer is the pending status, if the PUCCH is not transmitted due to a listen before talk (LBT) failure, the pending status is maintained in the one-shot AN buffer for the associated determined HARQ process ID, and if the PUCCH is transmitted, the default status is stored in the one-shot AN buffer for the associated determined HARQ process ID. In some embodiments, when a PUCCH is not for one-shot AN feedback but carries the AN status of the associated determined HARQ process ID whose AN status in the one-shot AN buffer is the default status, this default status is maintained in the one-shot AN buffer for the associated determined HARQ process ID no matter whether the PUCCH is transmitted or not. In some embodiments, when a PUCCH is not for one-shot AN feedback but carries the AN status of the associated determined HARQ process ID whose AN status in the one-shot AN buffer is the frozen status, the frozen status is maintained in the one-shot AN buffer for the associated determined HARQ process ID no matter whether the PUCCH is transmitted or not. In some embodiments, when a PUCCH is for one-shot AN feedback, if the PUCCH is not transmitted due to an LBT failure, all the AN status in the one-shot AN buffer remain unchanged for all configured HARQ process IDs; otherwise, the default AN status is set for all the configured HARQ process IDs.

In some embodiments, all configured HARQ process IDs are initialized with the default status. In some embodiments, AN status with all configured HARQ process IDs are stored in a one-shot feedback dedicated buffer.

FIG. 2 illustrates a method 200 for one-shot HARQ feedback of a UE according to an embodiment of the present disclosure. In some embodiments, the method 200 includes: a block 202, being configured with a one-shot HARQ-acknowledgement (ACK) feedback function, a block 204, receiving a physical downlink shared channel (PDSCH) transmission with an associated determined HARQ process identity (ID), and a block 206, updating an ACK/NACK (AN) status in a one-shot AN buffer for the associated determined HARQ process ID (HARQ status new) based on an already buffered AN status of the associated determined HARQ process ID (HARQ status old) and a PDSCH transmission status. This can greatly reduce AN status ambiguity between the network (e.g., gNB) 20 and the UE 10.

In some embodiments, the already buffered AN status of the associated determined HARQ process ID is a default status, a pending status, or a frozen status. In some embodiments, the PDSCH transmission status is a new transmission or a retransmission.

In some embodiments, updating the AN status in the one-shot AN buffer for the associated determined HARQ process ID (HARQ status new) comprises that: if the PDSCH transmission status is the new transmission and if the already buffered AN status of the associated determined HARQ process ID (HARQ status old) is the default status, the UE 10 sets the AN status in the one-shot AN buffer for the associated determined HARQ process ID (HARQ status new) as the pending status, where the pending status is an ACK if the PDSCH transmission status is successfully received, otherwise the pending status is a negative acknowledgement (NACK); if the PDSCH transmission status is the retransmission and if the already buffered AN status of the associated determined HARQ process ID (HARQ status old) is the default status, the UE 10 sets the AN status in the one-shot AN buffer for the associated determined HARQ process ID (HARQ status new) as the pending status, where the pending status is an ACK if the PDSCH transmission status is successfully received, otherwise the pending status is a NACK. That is, the default status can be changed to the pending status, if the PDSCH is the new transmission or the retransmission.

In another embodiment, updating the AN status in the one-shot AN buffer for the associated determined HARQ process ID (HARQ status new) comprises that: if the PDSCH transmission status is the new transmission and if the already buffered AN status of the associated determined HARQ process ID (HARQ status old) is the default status, the UE 10 sets the AN status in the one-shot AN buffer for the associated determined HARQ process ID (HARQ status new) as the pending status, where the pending status is an ACK if the PDSCH transmission status is successfully received, otherwise the pending status is a negative acknowledgement (NACK); if the PDSCH transmission status is the retransmission and if the already buffered AN status of the associated determined HARQ process ID is the default status, the UE 10 sets the AN status in the one-shot AN buffer for the associated determined HARQ process ID as the default status. That is, the default status can be updated to the pending status only by the new transmission. In addition, the default status is maintained in the one-shot AN buffer for the associated determined HARQ process ID, if the PDSCH is the retransmission.

In some embodiments, updating the AN status in the one-shot AN buffer for the associated determined HARQ process ID (HARQ status new) comprises that: if the PDSCH transmission status is the new transmission and if the already buffered AN status of the associated determined HARQ process ID (HARQ status old) is the pending status, the UE 10 neglects an AN outcome of a PDSCH reception and sets the AN status in the one-shot AN buffer for the associated determined HARQ process ID (HARQ status new) as the already buffered AN status of the associated determined HARQ process ID (HARQ status old), or the UE 10 sets the AN status in the one-shot AN buffer for the associated determined HARQ process ID (HARQ status new) as the frozen status; if the PDSCH transmission status is the retransmission and if the already buffered AN status of the associated determined HARQ process ID (HARQ status old) is the pending status, the UE 10 updates the AN status in the one-shot AN buffer for the associated determined HARQ process ID (HARQ status new) by setting the pending status to an ACK if the PDSCH is successfully received; otherwise the pending status is a NACK. That is, the pending status can only be updated by the retransmission.

In some embodiments, updating the AN status in the one-shot AN buffer for the associated determined HARQ process ID (HARQ status new) comprises that: if either the PDSCH transmission status is the new transmission or the retransmission and if the already buffered AN status of the associated determined HARQ process ID (HARQ status old) is the frozen status, the UE 10 keeps the frozen status in the one-shot AN buffer for the associated determined HARQ process ID and neglects an AN outcome of a PDSCH reception. That is, the frozen status cannot be updated.

In some embodiments, the default status is a NACK, the pending status is an actual AN of a PDSCH reception, and the frozen status is a NACK. In some embodiments, when a physical uplink control channel (PUCCH) is not for one-shot AN feedback but carries the AN status of the associated determined HARQ process ID whose AN status in the one-shot AN buffer is the pending status, if the PUCCH is not transmitted due to a listen before talk (LBT) failure, the pending status is maintained in the one-shot AN buffer for the associated determined HARQ process ID, and if the PUCCH is transmitted, the default status is stored in the one-shot AN buffer for the associated determined HARQ process ID. In some embodiments, when a PUCCH is not for one-shot AN feedback but carries the AN status of the associated determined HARQ process ID whose AN status in the one-shot AN buffer is the default status, this default status is maintained in the one-shot AN buffer for the associated determined HARQ process ID no matter whether the PUCCH is transmitted or not. In some embodiments, when a PUCCH is not for one-shot AN feedback but carries the AN status of the associated determined HARQ process ID whose AN status in the one-shot AN buffer is the frozen status, the frozen status is maintained in the one-shot AN buffer for the associated determined HARQ process ID no matter whether the PUCCH is transmitted or not. In some embodiments, when a PUCCH is for one-shot AN feedback, if the PUCCH is not transmitted due to an LBT failure, all the AN status in the one-shot AN buffer remain unchanged for all configured HARQ process IDs; otherwise, the default AN status is set for all the configured HARQ process IDs.

In some embodiments, all configured HARQ process IDs are initialized with the default status. In some embodiments, AN status with all configured HARQ process IDs are stored in a one-shot feedback dedicated buffer.

FIG. 3 illustrates an example for UE to prepare ACK/NACK (AN) status for one-shot HARQ-ACK feedback according to an embodiment of the present disclosure.

Example 1

A default AN status can be updated by a pending AN status; but the pending AN status cannot be updated further until one-shot AN feedback is reported.

In this example, a UE is configured with one-shot HARQ feedback without an NDI mode and a second HARQ-ACK feedback mode, which is based on codebook, e.g. a semi-static codebook based or a dynamic codebook based or an enhanced dynamic codebook based. It is assumed that the UE is configured with 4 HARQ processes (HARQ0~3) and in FIG. 3, it illustrates that the UE receives downlink control information (DCI) scheduling for PDSCH1 with HARQ1 and this PDSCH is a new transmission. Moreover, the corresponding HARQ-ACK feedback is scheduled in PUCCH1. Note that in PUCCH1, it is assumed that it is not a one-shot HARQ-ACK feedback but a second HARQ-ACK feedback mode. Furthermore, it is assumed that before receiving PDSCH1, HARQ1 is not scheduled yet; therefore, its initial status is a default AN status in a one-shot AN buffer. After PDSCH1 reception, if the UE successfully decodes the PDSCH, the UE sets the AN status to a pending status with ACK in the one-shot AN buffer. Then the UE will send PUCCH1 carrying the ACK for HARQ1 following the second HARQ-ACK codebook rule. If, due to LBT failure, the UE does not manage to send PUCCH1, UE keeps the pending status with ACK for HARQ1 in the one-shot AN buffer.

Next, the UE receives another DCI, which schedules PDSCH2 with HARQ1. If the PDSCH2 is also a new transmission and the corresponding HARQ-ACK feedback is scheduled in PUCCH2 (assuming PUCCH2 is not one-shot feedback either). Since the AN status of HARQ1 in the one-shot AN buffer is the pending status before receiving PDSCH2, thus, UE neglects the AN of PDSCH2 in the one-shot AN buffer and keeps the previous pending AN status with ACK. Note that the AN status of PDSCH2 will be recorded in the second codebook based feedback, i.e.

only one-shot AN buffer will neglect it. Moreover, since the AN status of PDSCH2 is neglected for one-shot AN feedback, the LBT outcome of PUCCH2 dose not change the pending status of HARQ1, this is because in one-shot AN buffer the HARQ1 only contains the pending AN status for PDSCH1 instead of PDSCH2.

If later one-shot feedback is triggered, as shown in FIG. 3, the one-shot AN feedback will be reported in PUCCH3. Thus, for HARQ1, UE will report the pending AN status with ACK, which refers to the AN status of PDSCH1.

In this example, the UE will consider the first AN status switching from the default status to the pending status, after the first pending status, any later new PDSCH reception with the same HARQ ID will be neglected and won't be recorded in the one-shot AN buffer. Thus, this UE behavior will greatly reduce the AN status ambiguity between gNB and UE. However, the later scheduled PDSCH than PDSCH1 will not be reported in the one-shot AN feedback. After one-shot AN feedback is reported (i.e. LBT passed for PUCCH3), all the configured HARQ processes are reset to default AN status in the one-shot AN buffer.

Figure 4:
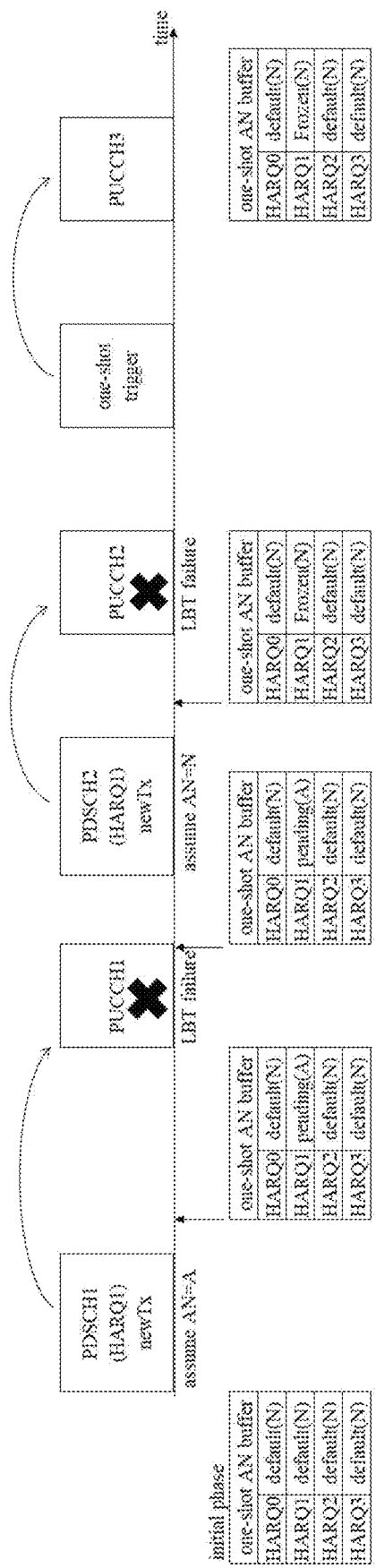
FIG. 4 is a schematic diagram illustrating an example for UE to prepare AN status for one-shot HARQ-ACK feedback according to an embodiment of the present disclosure.

FIG. 4 illustrates an example for UE to prepare AN status for one-shot HARQ-ACK feedback according to an embodiment of the present disclosure.

Example 2

A default AN status can be updated by a pending AN status; but the pending AN status can be set to a frozen AN status once the same HARQ process is used for more than one PDSCH new transmission. The frozen AN status can be reset to default after one-shot AN feedback is reported.

In this example, a different UE behavior is presented. Similar situation happens as in previous example. However, in this example, it is introduced a frozen AN status. The frozen AN status will happen when a new transmission is scheduled with a HARQ ID, in which there is already a pending AN status. As illustrated in FIG. 4, where the UE will keep the pending AN status with ACK after PUCCH1 LBT failure. When the new transmission of PDSCH2 is scheduled with the HARQ1, the UE will set the AN status as frozen AN status with NACK. Once the AN status for a HARQ ID is the frozen AN status, it will remain the frozen AN status which is always NACK for HARQ1 until one-shot AN feedback is reported. After one-shot AN feedback is reported (i.e. LBT passed for PUCCH3), all the configured HARQ processes are reset to default AN status in the one-shot AN buffer.

Figure 5:
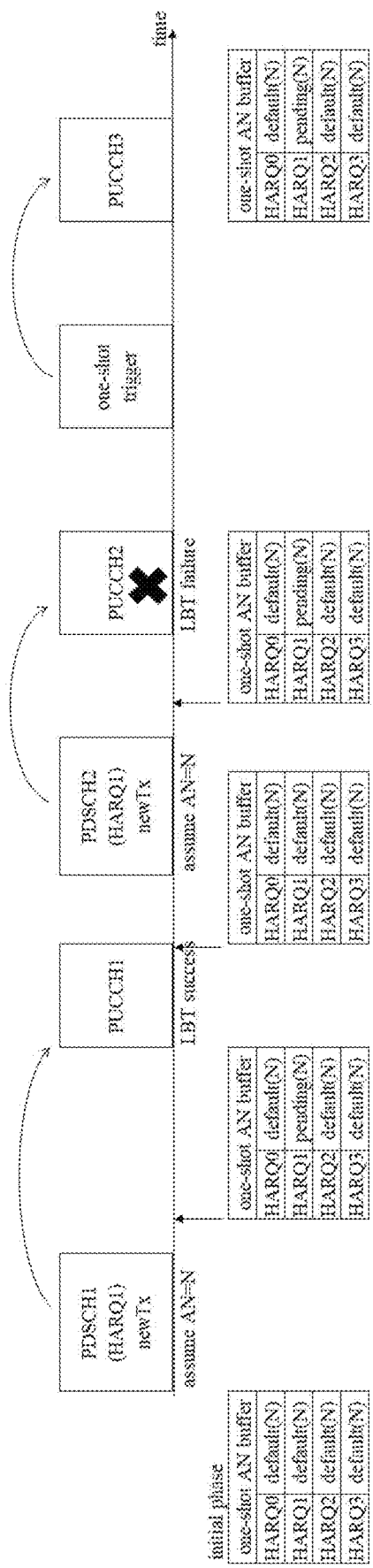
FIG. 5 is a schematic diagram illustrating an example for UE to prepare AN status for one-shot HARQ-ACK feedback according to an embodiment of the present disclosure.

FIG. 5 illustrates an example for UE to prepare AN status for one-shot HARQ-ACK feedback according to an embodiment of the present disclosure.

Example 3

Once the AN of a given HARQ process is reported, its AN status in one-shot AN buffer is set to default AN status.

In this example, different from examples 1 and 2, the UE has passed LBT for PUCCH1, thus after PUCCH1 transmission, the UE sets AN status for HARQ1 as default AN status with NACK. When PDSCH2 is scheduled with new transmission, the UE will change the default AN status to pending AN status for HARQ1 and this AN status represents for PDSCH2. Thus, if PUCCH2 has passed LBT, the one-shot AN status for HARQ1 will change to default AN status with NACK; otherwise, the one-shot AN status for HARQ1 will remain pending AN status presenting AN status for PDSCH2. After one-shot AN feedback is reported (i.e. LBT passed for PUCCH3), all the configured HARQ processes are reset to default AN status in the one-shot AN buffer.

Figure 6:
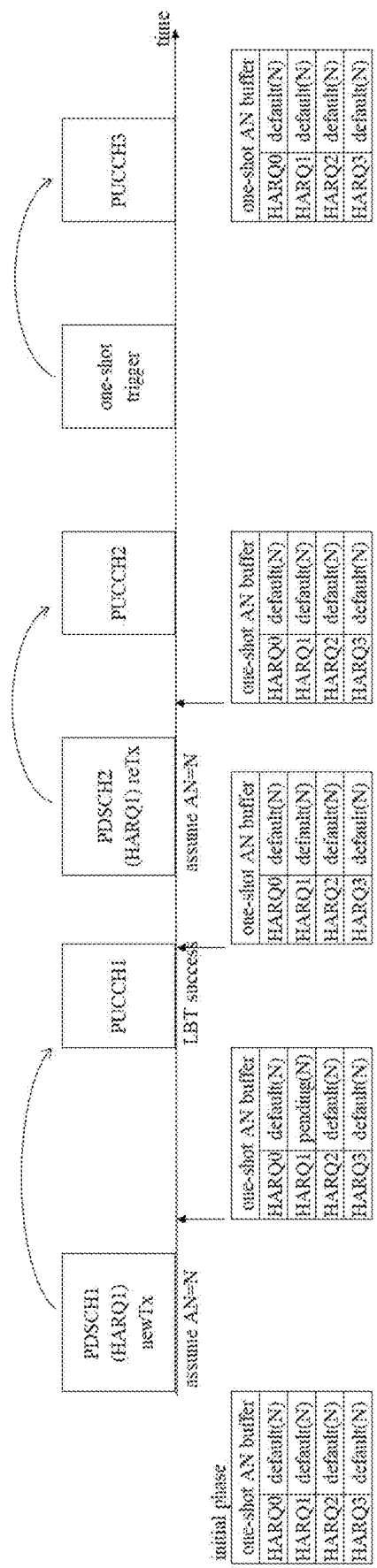
FIG. 6 is a schematic diagram illustrating an example for UE to prepare AN status for one-shot HARQ-ACK feedback according to an embodiment of the present disclosure.

FIG. 6 illustrates an example for UE to prepare AN status for one-shot HARQ-ACK feedback according to an embodiment of the present disclosure.

Example 4

A default AN status cannot be updated by retransmission of the same HARQ process, while a pending AN status can be updated by the retransmission of the same HARQ process.

In another case, when the PDSCH2 is not a new transmission but a retransmission. The UE will first check the AN status in one-shot AN buffer for HARQ1. If its status is a default AN status, the UE will maintain this status as is. If its status is a pending AN status, the UE will keep the pending AN status but the actual ACK or NACK in the pending AN status depends on the PDSCH2 reception. This implies that if the PDSCH1 reception gives a NACK, and the PUCCH1 has been transmitted (i.e. LBT success), then the default AN status with NACK will be set for HARQ1 and this status will not be changed with later reception of the retransmission. However, if the PUCCH1 has not been reported due to LBT failure, the pending AN status will be set, and the actual AN status can be updated by later reception of the retransmission. After one-shot AN feedback is reported (i.e. LBT passed for PUCCH3), all the configured HARQ processes are reset to default AN status in the one-shot AN buffer.

A further enhancement for example 4 is that the default AN status can be updated by later retransmission only if PDSCH1 AN outcome is NACK. In this case, the default AN status can be changed to the pending AN state.

Figure 7:
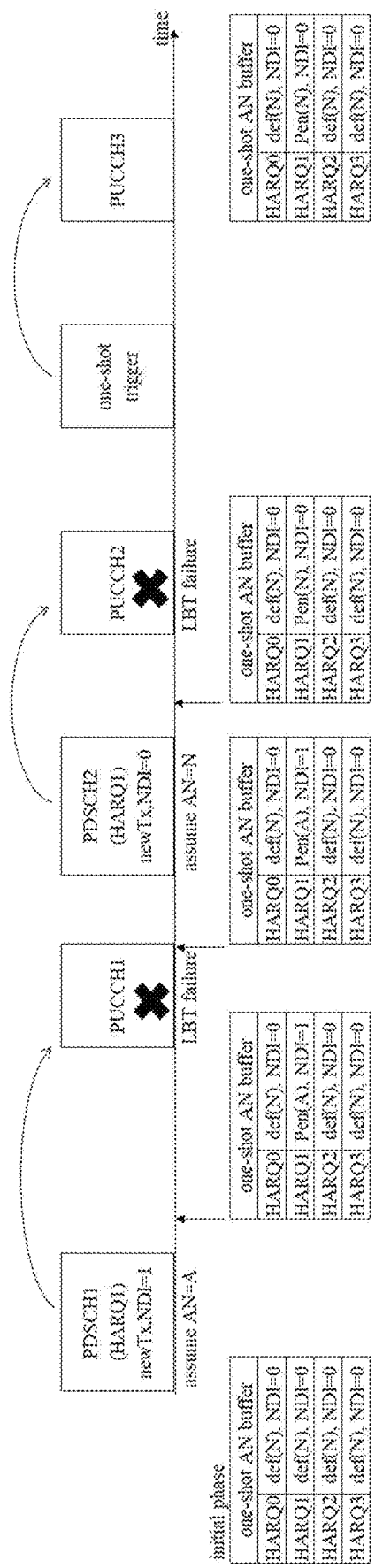
FIG. 7 is a schematic diagram illustrating an example for UE to prepare AN status for one-shot HARQ-ACK feedback according to an embodiment of the present disclosure.

FIG. 7 illustrates an example for UE to prepare AN status for one-shot HARQ-ACK feedback according to an embodiment of the present disclosure.

Example 5

For one-shot AN feedback with NDI reporting mode, a pending AN status can be updated by later new transmission with the same HARQ process; the updating includes AN status and NDI value.

In another configuration, where the UE is configured with one-shot AN feedback with NDI reporting mode. In the one-shot AN buffer, the UE will record the AN status and an NDI value of the corresponding reported HARQ process ID. As illustrated in FIG. 7, only the initial phase is a default AN status with NACK for all configured HARQ process ID. Once the HARQ process ID is used by the gNB to schedule PDSCH, the UE always sets the AN status for this HARQ as pending AN status and actual AN status depends on the PDSCH reception outcome, i.e. PDSCH is decoded successfully as ACK; NACK otherwise. In FIG. 7, the UE first receives PDSCH1 for HARQ1 as new transmission and NDI=1. If UE successfully decodes PDSCH1, UE will set pending AN=ACK in one-shot AN status buffer together with NDI=1. If the corresponding PUCCH1 is not reported due to LBT failure, UE keeps the pending AN status in the buffer. Later on, if the UE receives a new transmission PDSCH2 with HARQ1 and the PDSCH2 is also a new transmission (NDI is toggled, i.e. NDI=0). If the UE does not successfully decode the PDSCH2 (i.e. NACK), the UE will set pending AN=NACK and changes NDI=0 in the one-shot AN buffer. When one-shot feedback is triggered, for HARQ1, the UE will report NACK and NDI=0 for HARQ1. The gNB receives this feedback and understands that this NACK relates to PDSCH2 as its NDI=0.

Example 6

In a special configuration case, where the UE is configured with one-shot AN feedback with NDI reporting mode. Moreover, the UE is also configured with SRS PDSCH configuration and SRS PDSCH is activated. Then the UE behavior is changed based on whether the HARQ process is used for SPS PDSCH. The reason is that the SPS PDSCH does not have an actual NDI value. Therefore, if one HARQ process ID is used for SPS-PDSCH, a default NDI value is recorded in the one-shot AN buffer.

In summary, embodiments of the present disclosure provide a UE with a method for one-shot HARQ feedback in the mode of one-shot feedback without NDI reporting. The presented method can reduce AN status ambiguity between a network (e.g., gNB) and the UE, which happens in the case where the same HARQ process ID is reused for more than one PDSCH transmission.

Commercial interests for some embodiments are as follows. 1. reducing AN status ambiguity between a network (e.g., gNB) and the UE. 2. providing a good communication performance. 3. providing a high reliability. 4. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product. Some embodiments of the present disclosure could be adopted in the 5G NR unlicensed band communications. Some embodiments of the present disclosure propose technical mechanisms.

Figure 8:
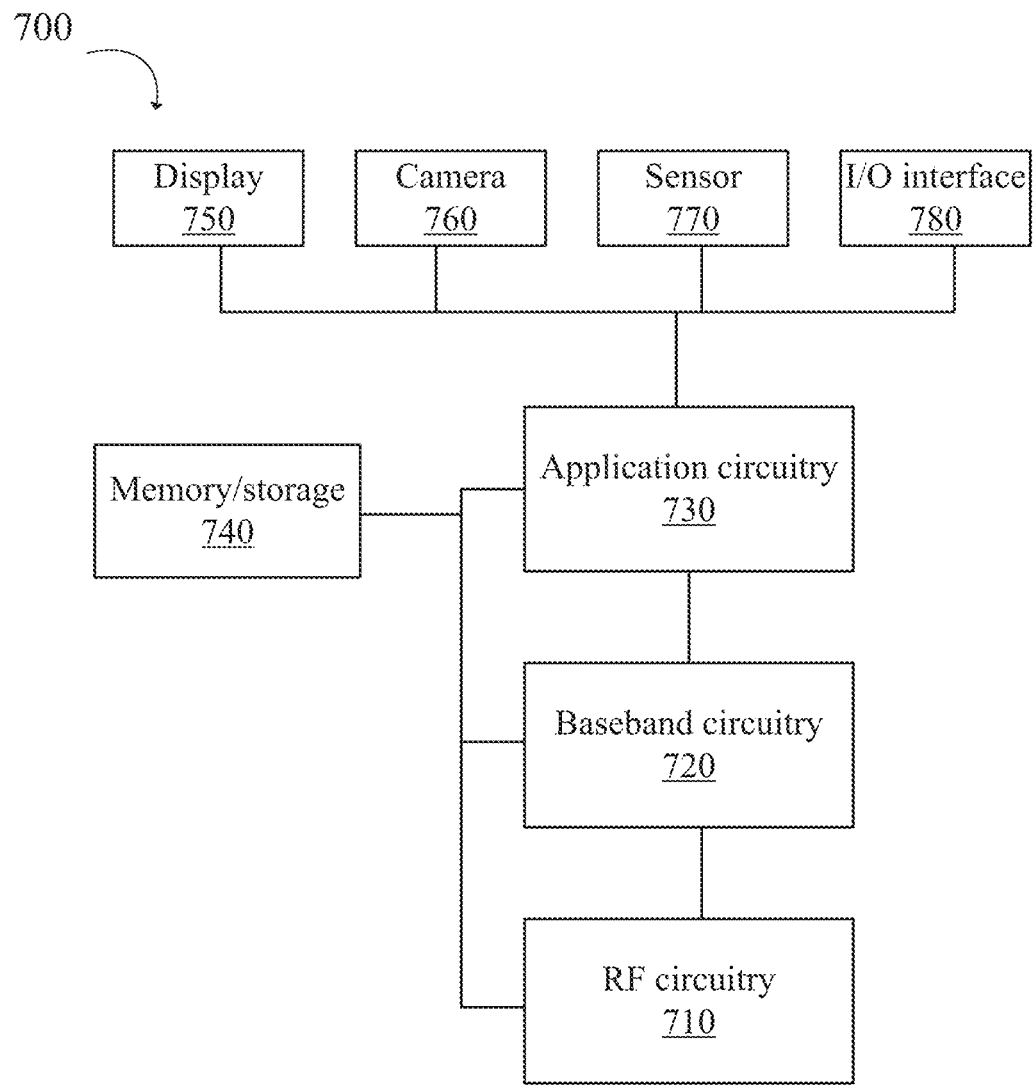
FIG. 8 is a block diagram of a system for wireless communication according to an embodiment of the present disclosure.

FIG. 8 is a block diagram of an example system 700 for wireless communication according to an embodiment of the present disclosure. Embodiments described herein may be implemented into the system using any suitably configured hardware and/or software. FIG. 8 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, a AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan.

A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A user equipment for one-shot hybrid automatic repeat request (HARQ) feedback, comprising:
    a memory;
    a transceiver; and
    a processor coupled to the memory and the transceiver;
    wherein the processor is configured to:
    be configured with a one-shot HARQ-acknowledgement (ACK) feedback function;
    receive a physical downlink shared channel (PDSCH) transmission with an associated determined HARQ process identity (ID); and
    update an ACK/negative acknowledgement (NACK) (AN) status in a one-shot AN buffer for the associated determined HARQ process ID based on an already buffered AN status of the associated determined HARQ process ID and a PDSCH transmission status;
    wherein the already buffered AN status of the associated determined HARQ process ID is a default status, a pending status, or a frozen status;
    wherein the PDSCH transmission status is a new transmission or a retransmission;
    wherein the default status is a NACK, the pending status is an actual AN of a PDSCH reception, and the frozen status is a NACK;
    wherein when a physical uplink control channel (PUCCH) is not for one-shot AN feedback but carries the AN status of the associated determined HARQ process ID whose AN status in the one-shot AN buffer is the pending status, if the PUCCH is not transmitted due to a listen before talk (LBT) failure, the pending status is maintained in the one-shot AN buffer for the associated determined HARQ process ID, and if the PUCCH is transmitted, the default status is stored in the one-shot AN buffer for the associated determined HARQ process ID.

2. The user equipment of claim 1, wherein updating the AN status in the one-shot AN buffer for the associated determined HARQ process ID comprises that: if the PDSCH transmission status is the new transmission and if the already buffered AN status of the associated determined HARQ process ID is the default status, the processor sets the AN status in the one-shot AN buffer for the associated determined HARQ process ID as the pending status, where the pending status is an ACK if the PDSCH transmission is successfully received, otherwise the pending status is a NACK.

3. The user equipment of claim 1, wherein updating the AN status in the one-shot AN buffer for the associated determined HARQ process ID comprises that: if the PDSCH transmission status is the retransmission and if the already buffered AN status of the associated determined HARQ process ID is the default status, the processor sets the AN status in the one-shot AN buffer for the associated determined HARQ process ID as the pending status or the default status, where the pending status is an ACK if the PDSCH transmission is successfully received, otherwise the pending status is a NACK.

4. The user equipment of claim 1, wherein updating the AN status in the one-shot AN buffer for the associated determined HARQ process ID comprises that: if the PDSCH transmission status is the new transmission and if the already buffered AN status of the associated determined HARQ process ID is the pending status, the processor neglects an AN outcome of a PDSCH reception and sets the AN status in the one-shot AN buffer for the associated determined HARQ process ID as the already buffered AN status of the associated determined HARQ process ID, or the processor sets the AN status in the one-shot AN buffer for the associated determined HARQ process ID as the frozen status.

5. The user equipment of claim 1, wherein updating the AN status in the one-shot AN buffer for the associated determined HARQ process ID comprises that: if the PDSCH transmission status is the retransmission and if the already buffered AN status of the associated determined HARQ process ID is the pending status, the processor updates the AN status in the one-shot AN buffer for the associated determined HARQ process ID by setting the pending status to an ACK if the PDSCH is successfully received; otherwise the pending status is a NACK.

6. The user equipment of claim 1, wherein updating the AN status in the one-shot AN buffer for the associated determined HARQ process ID comprises that: if either the PDSCH transmission status is the new transmission or the retransmission and if the already buffered AN status of the associated determined HARQ process ID is the frozen status, the processor keeps the frozen status in the one-shot AN buffer for the associated determined HARQ process ID and neglects an AN outcome of a PDSCH reception.

7. The user equipment of claim 1, wherein when a PUCCH is not for one-shot AN feedback but carries the AN status of the associated determined HARQ process ID whose AN status in the one-shot AN buffer is the default status, this default status is maintained in the one-shot AN buffer for the associated determined HARQ process ID no matter whether the PUCCH is transmitted or not.

8. The user equipment of claim 1, wherein when a PUCCH is not for one-shot AN feedback but carries the AN status of the associated determined HARQ process ID whose AN status in the one-shot AN buffer is the frozen status, the frozen status is maintained in the one-shot AN buffer for the associated determined HARQ process ID no matter whether the PUCCH is transmitted or not.

9. The user equipment of claim 1, wherein when a PUCCH is for one-shot AN feedback, if the PUCCH is not transmitted due to an LBT failure, all the AN status in the one-shot AN buffer remain unchanged for all configured HARQ process IDs; otherwise, the default status is set for all the configured HARQ process IDs.

10. The user equipment of claim 1, wherein all configured HARQ process IDs are initialized with the default status.

11. The user equipment of claim 1, wherein AN status with all configured HARQ process IDs are stored in a one-shot feedback dedicated buffer.

12. A method for one-shot hybrid automatic repeat request (HARQ) feedback of a user equipment, comprising:
being configured with a one-shot HARQ-acknowledgement (ACK) feedback function;
receiving a physical downlink shared channel (PDSCH) transmission with an associated determined HARQ process identity (ID); and
updating an acknowledgement (ACK)/negative acknowledgement (NACK) (AN) status in a one-shot AN buffer for the associated determined HARQ process ID based on an already buffered AN status of the associated determined HARQ process ID and a PDSCH transmission status;
wherein the already buffered AN status of the associated determined HARQ process ID is a default status, a pending status, or a frozen status;
wherein the PDSCH transmission status is a new transmission or a retransmission;
wherein the default status is a NACK, the pending status is an actual AN of a PDSCH reception, and the frozen status is a NACK;
wherein when a physical uplink control channel (PUCCH) is not for one-shot AN feedback but carries the AN status of the associated determined HARQ process ID whose AN status in the one-shot AN buffer is the pending status, if the PUCCH is not transmitted due to a listen before talk (LBT) failure, the pending status is maintained in the one-shot AN buffer for the associated determined HARQ process ID, and if the PUCCH is transmitted, the default status is stored in the one-shot AN buffer for the associated determined HARQ process ID.

13. The method of claim 12, wherein updating the AN status in the one-shot AN buffer for the associated determined HARQ process ID comprises that: if the PDSCH transmission status is the new transmission and if the already buffered AN status of the associated determined HARQ process ID is the default status, the user equipment sets the AN status in the one-shot AN buffer for the associated determined HARQ process ID as the pending status, where the pending status is an ACK if the PDSCH transmission is successfully received, otherwise the pending status is a NACK.

14. The method of claim 12, wherein updating the AN status in the one-shot AN buffer for the associated determined HARQ process ID comprises that: if the PDSCH transmission status is the retransmission and if the already buffered AN status of the associated determined HARQ process ID is the default status, the user equipment sets the AN status in the one-shot AN buffer for the associated determined HARQ process ID as the pending status or the default status, where the pending status is an ACK if the PDSCH transmission status is successfully received, otherwise the pending status is a NACK.

* * * * *